Sept. 24, 1968     J. M. WININGER, JR., ET AL     3,402,548
PROCESS FOR FRACTURING FLAT RIBBONS
AND THE PRODUCT THEREOF
Filed March 25, 1965                              2 Sheets-Sheet 1
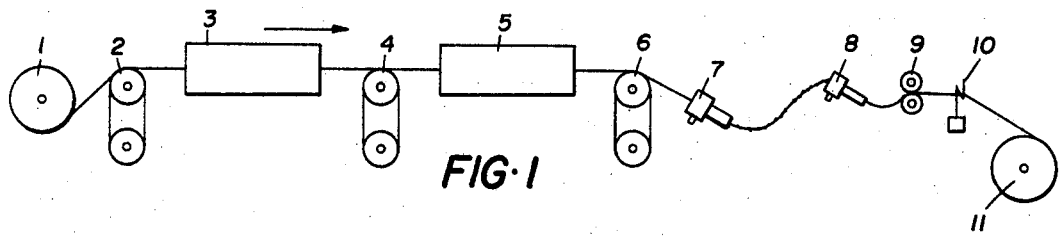
FIG. 1
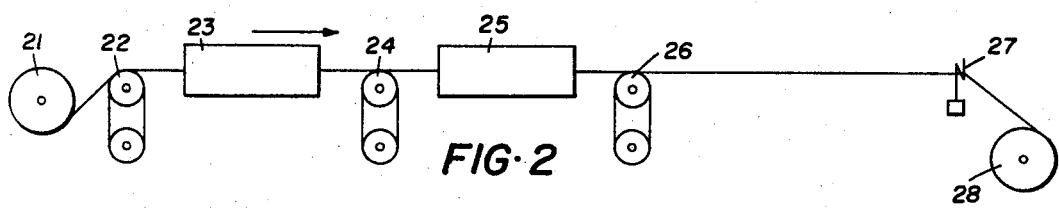
FIG. 2
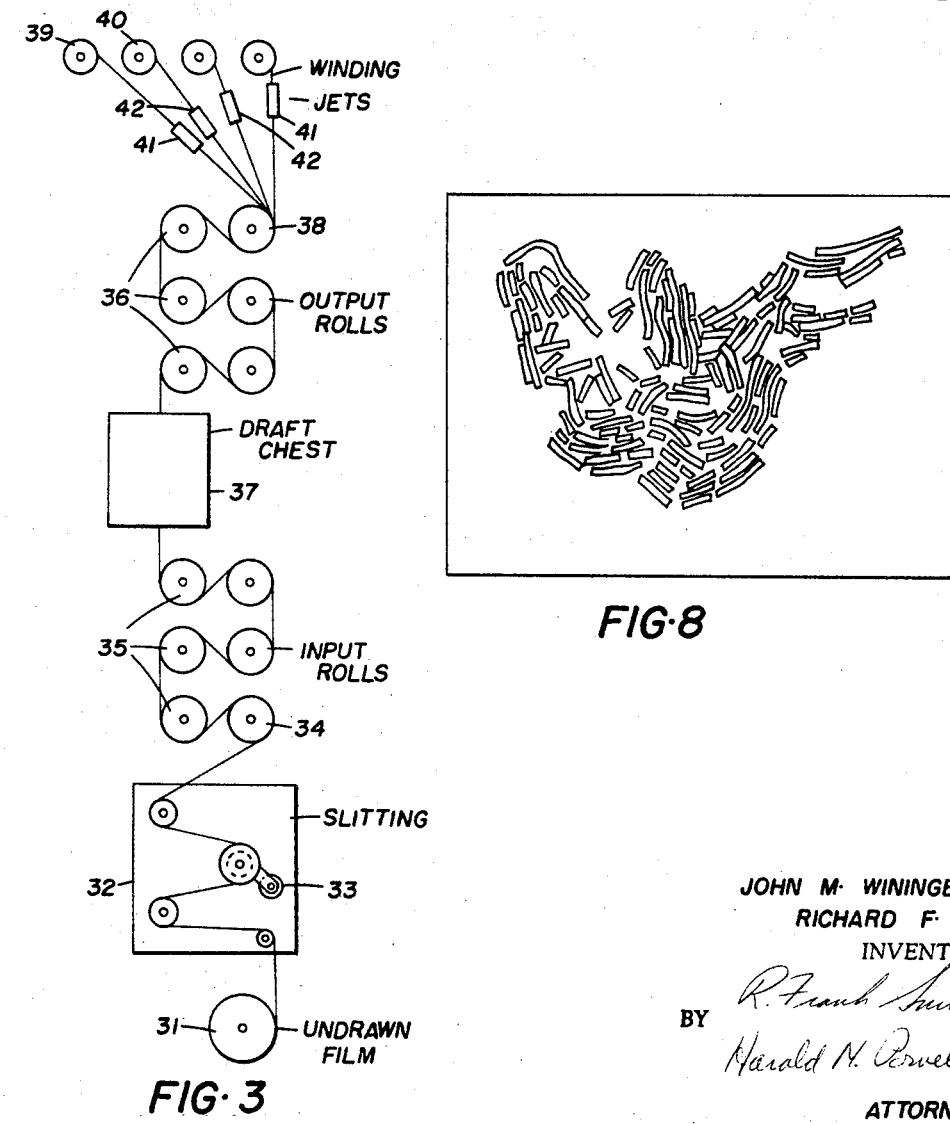
FIG. 8
FIG. 3
JOHN M. WININGER, JR.
RICHARD F. DYER
INVENTORS
BY
ATTORNEYS Sept. 24, 1968   J. M. WININGER, JR., ET AL   3,402,548
PROCESS FOR FRACTURING FLAT RIBBONS
AND THE PRODUCT THEREOF
Filed March 25, 1965   2 Sheets-Sheet 2

JOHN M. WININGER, JR.
RICHARD F. DYER
INVENTORS

BY R. Frank Smith
Harold N. Sewell

ATTORNEYS

United States Patent Office 3,402,548
Patented Sept. 24, 1968

3,402,548
PROCESS FOR FRACTURING FLAT RIBBONS AND THE PRODUCT THEREOF
John M. Wininger, Jr., and Richard F. Dyer, Kingsport, Tenn., assignors to Eastman Kodak Company, Rochester, N.Y., a corporation of New Jersey
Continuation-in-part of applications Ser. No. 257,386, Feb. 11, 1963, and Ser. No. 432,178, Feb. 12, 1965. This application Mar. 25, 1965, Ser. No. 442,690
8 Claims. (Cl. 57—140)

ABSTRACT OF THE DISCLOSURE

An improved process for producing an improved fractured film product having low boiling water and hot oven shrinkage including the steps of subjecting a film of a polymeric material to longitudinal drafting to produce orientation thereof, and fracturing the film by subjecting it to forces sufficient to cause discontinuous, longitudinally extending slits to be formed therein producing a plurality of elongated, interconnected, flat ribbons. The improved result is accomplished by drafting the film in a zone of elevated temperature over a total distance at least five times the distance from the point where the film enters the zone of elevated temperature to the point where the draw neck of the film occurs.

---

This application is a continuation-in-part of our U.S. application Ser. No. 257,386, filed Feb. 11, 1963, now abandoned, and our U.S. application Ser. No. 432,178, filed Feb. 12, 1965, now U.S. Patent No. 3,214,899.

This invention relates particularly to a relatively inexpensive process and apparatus for the production of fractured, flat ribbons as in the form of cordage as more fully described in our patent aforesaid, and certain other products.

In the industry as well known there are a number of products presently produced from jute, hemp, sisal and cotton and the like material of vegetable origin. These products range from rug backings and bags to simple twine or string used for tying packages. As also known such products because of their vegetable nature are susceptible to attack by bugs, mildew and other destructive forces. Also some of these vegetable material fibers have considerable color. Hence, when they are used for rug backing materials, for example, there is the possibility of moisture causing some of this color to seep through into the top rug fibers. With the advent of various polymeric compositions which are resistant and inert, it can be seen that making such type textile products from polymeric compositions would have some advantages.

Hence, work has been expended in spinning various resistant polymeric compositions through spinnerettes to obtain polymeric filaments. Such spinnerette spun filaments, except for high expense of manufacture, are usually resistant, excellent symmetrical filaments. However, we have found the expense and symmetry works against the use of such filaments for the above referred purposes. That is, such melt spun polymeric filaments may be prone to be slippery and hence do not strongly adhere even when substantial twist is imparted to the monofilaments.

It has been proposed to incorporate roughening agents into such monofilaments from such melt spun polymeric compositions and this may have advantages under some circumstances. On the other hand such additives further increase the cost of the symmetrical filaments and may cause abrasive action on equipment used to make articles of the class indicated from such filaments.

It is therefore apparent that the development of a simplified, convenient process and apparatus for the production of a material which we refer to as fractured flat ribbons, in contrast to melt spun monofilaments, and which can be used for the aforesaid purposes represents a highly desirable result. After extended investigation we have found what is believed to be a materially different procedure for making products of the class indicated. This procedure is not only relatively simple, fast and less expensive than melt spinning spinnerette but permits the production of products of a coarseness more suitable for the uses as aforementioned and also provides a process extending to further new products and fields of usage.

In further detail the stiffness and large denier size of, for example, polypropylene monofilaments cause it to be too stiff for many end uses. A finer denier multifilament polymeric material would be much more desirable in many rug backing and in other end uses such as fish lines and fish nets. The cost of producing a fine denier per filament multifilament, continuous filament or staple polymeric yarn, however, is quite high due to the slow production rates and the expensive equipment such as spinnerettes and melt spinning machines which are required to process the polymer into a yarn. Two types of multifilament yarn are common in the industry. The first of these is composed of continuous filaments. The second is composed of staple fibers. Traditionally, continuous filament yarn is considerably more expensive but is stronger than yarn which has been spun from chopped-up filaments or staple fibers. Staple fiber yarns while somewhat less costly are weaker in strength. It is highly desirable, therefore, that a method of converting polymer into high-strength flexible multifilament textile type material be devised which would utilize the low cost extrusion equipment of the film extruding industries and still retain the flexibility and hand of continuous filament yarns or staple yarns traditional in the textile trade.

In its broader aspects this invention utilizes a method of converting film into textile material by subjecting the solid film to the disintegrating action of a gaseous media. By varying the conditions of the fluid treatment of the solid film, textile materials may be made which vary in appearance from that of a continuous filament yarn containing few or no broken filaments or loose filament ends to a staple-like product containing a large number of broken filament ends. It has also been found that by varying our novel method of treatment and the treating apparatus that the hand or feel of our product can be made rough or fine depending on the degree of breaking up the solid film into flat ribbons and the resultant size of the ribbons composing the yarn. It has also been found that our textile type product can be made bulky or compact by varying the conditions under which the treatment is carried out. While it is known in the prior art, to extrude a film, slit it into narrow width, orient it and then beat it with a brush or by similar mechanical treatments, these treatments of the prior art were difficult to control and made it impossible to obtain the wide variety of products possible by the instant invention.

One object of this invention is to disclose means which are economical and versatile for forming and converting solid film polymeric materials into textile products similar to existing fibers and yarns but having certain special properties. Another object is to provide a process involving extruding a film, orienting the solid film highly in a longitudinal direction, and subjecting it to the action of a high velocity fluid medium, and thereby forming the film into a product of the class indicated. A further object of this invention is to disclose a process of producing new textile type products which have an appearance somewhat similar to a multifilament, continuous filament textile yarn. Another object is to disclose a process of producing a flat ribbon type yarn from solid film which ribbon type product has an appearance similar to a staple fiber spun yarn. A further object is to disclose a process of converting a solid film into a product which has an appearance comparable to a bulky, staple-like yarn, said product being characterized by external loops and internal ribbon entanglement. A further object of this invention is to disclose means to convert solid film into a yarn like product which has an appearance similar to a highly entangled continuous multifilament yarn. A still further object of this invention is to disclose apparatus for economically converting solid film into any of the foregoing type products. Other objectives will be apparent from the description of the invention which follows.

For assistance in the understanding of this invention reference is made to the attached drawings forming a part of this application.

In these drawings:

FIGURE 1 is a schematic side elevation view of one system for drafting, heat setting and disintegrating the oriented film product into flat partially fractured ribbons of the present invention.

FIGURE 2 is likewise a schematic side elevation view of an alternate system for drafting, heat setting and winding the preliminary treated film when the disintegration it to be carried out in a subsequent operation.

FIGURE 3 is a schematic side elevation view for showing an alternative arrangement for slitting solid film which is to be made into the flat ribbon yarn in the present invention, drafting and fracturing the film and winding it up.

Figure 7:
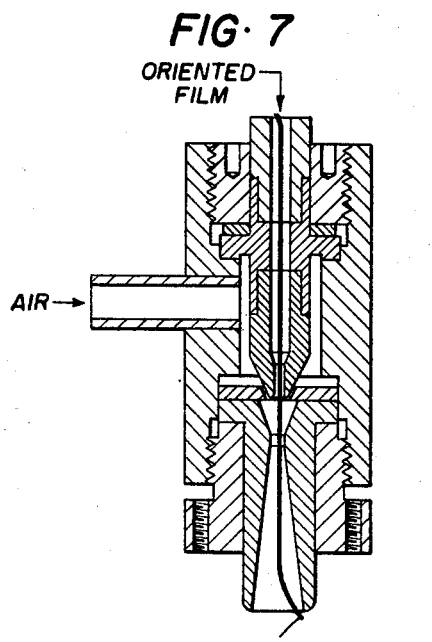

FIGURE 7 likewise is a cross-sectional view showing in more detail a form of jet which we prefer to employ in many instances for carrying out the herein described process.

FIGURE 8 is a cross-sectional view on a greatly enlarged scale indicating the general nature of that which a photomicrograph of the cross-section of our new product displays as to flat ribbons making up the product.

The nature and contents of the various parts making up the assemblies illustrated in the drawings are now described more completely as follows:

Referring to FIGURE 1, 1 represents the supply package for the film or sheeting to be processed in the present invention. In the event of continuous operations 1 would be an extruder. This supply 1 may comprise a conventional roll or drum of the film or other similarly convenient rotatable supply source or extruder as just indicated.

The supply source is in series with one or more canted rolls designated 2 about which the film may be wrapped one or more times before passing into drafting oven 3. This oven 3 may be of any of the usual constructions employed in the film or yarn manufacturing industry. It can be heated electrically or with hot air or any other convenient and controllable source of heat such as infrared lamps. In general, it has been found satisfactory to maintain the operating temperature of the drafting oven in the range of 300° F. to 400° F.

The film discharging from oven 3 is wrapped around canted rolls 4 for feeding into oven 5. These canted rolls 4 may be the same as rolls 2 or rolls 6 to be referred to shortly. Likewise oven 5 may be of the same general construction as oven 3 but in this particular embodiment of FIGURE 1 oven 5 is employed for heat setting as will be explained in more detail hereinafter.

Figure 6:
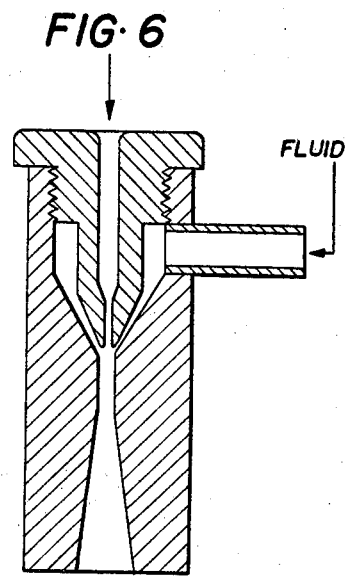
FIGURE 6 is a side elevation view in cross-section showing in more detail a form of jet which we prefer to employ in many instances for carrying out the herein described process.

Oven 5 discharges onto and around canted rolls 6 which feed into a rather large jet the construction of which is shown in detail in FIGURES 6 and 7 referred to above. This large jet 7 discharges to a smaller jet 8 the construction of which may likewise be the same as just mentioned, differing primarily only in being of smaller size.

The fractured film product from the jet 8 is picked up between the nips between the pair of pressure rolls 9, passes through a conventional traverse guide 10 onto roll 11 or other desired packaging device such as a twister or other utilization.

The construction shown in FIGURE 2 will now be described. This construction is generally similar to that shown in FIGURE 1 and comprises a film supply 21 which may be made up of a roll or drum of film or other convenient source of the film to be processed. The film or sheeting withdrawn from 21 is passed around canted rolls into oven 23 which is the same as the oven referred to in FIGURE 1. The heated film from this oven is withdrawn around canted rolls 24 to the heat set oven 25. After the drafted film is suitably heat set therein, it is withdrawn around further rolls 26 through the guide 27 to the take-up package 28. From the foregoing it will be observed that the arrangement in this FIGURE 2 is generally similar to that of FIGURE 1 excepting that the several jets in series have been omitted. In the construction described in this figure the drafted film ribbon or band taken up on package 28 would be transferred to subsequent processing in apparatus construction as will be described in connection with FIGURES 4 and 5.

Reference is now made to FIGURE 3 which in some respects is similar to FIGURE 2. However, in the apparatus set up of FIGURE 3 the film is both drawn and fractured.

In FIGURE 3 the unoriented film is provided from a supply source 31 which may be a wide roll of extruded film or a film extruder. Film source 31 feeds into a unit 32 wherein a conventional slitting mechanism 33 slits the wider film sheet into smaller sections or ribbons which emerge at 34 and are conducted around a plurality of rolls 35. These rolls which may be considered input rolls in cooperation with similar output rolls 36 permit the drafting or orienting of the slit film in draft chest 37. That is, the draft chest may be either externally heated or heated with an injected fluid to raise the temperature of the film therein a suitable amount so that by operating the output rolls at a higher rate of speed than the input rolls, a suitable degree of longitudinal orientation is applied to the film.

The longitudinally oriented film ribbon coming off the last roll 38 of the output rolls 36 is then fed to jets 41 and 42 where it is suitably fractured to the desired denier per filament size and then collected on packages 39 and 40 or in other suitable forms such as bales, boxes, spools, or the like. The fractured film is then ready for use or may be twisted, plied, textured, crimped, or in other ways treated by conventional textile yarn processes.

While it is not desired to be bound by any theory of operation of our process, it has been found that the draw oven temperature, length of the heated zone, and the draw ratio or ratio of output rolls 36 speed to input rolls 35 speed should be correlated so that the degree of orientation imparted to the film in the draw zone results in a film strength of at least 3 grams per denier in the longitudinal direction and of less than 0.01 gram per denier in the transverse. The ratio of the longitudinal to the transverse strength is termed the fracturability factor and should be in excess of 300 and preferably is in the range of 1000 or more. Moreover the fracturability angle or the angle between the fracture cracks in the film and the longitudinal axis of the film, after the jet treatment, should be less than 5° and preferably less than 1°. However, if it is desired to make a staple-like yarn, the fracture angle may be in the range of 5 to 10°. It has also been found desirable to establish the draw oven temperature and length in relation to the speed of the film through the oven such that the film after drawing, fracturing, and forming into a yarn will have a low boiling water and hot oven shrinkage. Thus it is desirable to have the total length of the hot draw zone at least 5 times the distance from the point where the film enters the hot draw zone to the point where the draw neck occurs. This ratio may be called the draw/neck length ratio. If its value is relatively high for a given polymeric material the resultant yarn or fibers will tend to have low boiling water shrinkage. If a high draw ratio is used in conjunction with a high draw/neck length ratio the resultant yarns or fibers will have a high modulus. A high modulus or elastic stiffness value is particularly useful when the polymeric yarns or fibers are to be used as replacements for or in conjunction with the natural cellulosic fibers such as sisal, hemp, and cotton.

The draw ratio that can be imparted to a film is related to the thickness of the film and its polymeric composition. Thus a 1 mil thick polypropylene film may be drawn about 6 times its extruded length, whereas a 5 mil thick extruded polypropylene film may be drawn to 12 or more times its extruded length.

For any given combination of extruded film thickness, draw ratio, and fracturability factor the fracturing action of the air jet may be controlled to achieve a given percentage of the potential amount of fracturing possible. The potential fracturability may be determined by calculating the number of filament ribbons which could be produced in a drawn film that would have a width equal to three times their thickness. Thus a 1 mil thick drawn film three inches wide could be fractured into 1000 filaments of a 1 mil thick by 3 mil wide rectangular cross-section of greater than 1 inch length.

In general it is not desired to achieve 100 percent fracturing of the film. For example, it has been found that if less than 90 percent of the potential fracturing is present in the final product, a further fracturing can take place when the product is tied into a knot. This results in the structure in the knot having more filament-like ribbons than the structure immediately outside the knot area. When a load is applied to the knot the stiffer filaments outside the knot resist rolling of the knot along the structure and the finer filaments inside the knot compact together more readily than the stiffer filaments outside the knot. Thus the knot becomes tighter and does not roll out or slip as do knots in smooth continuous synthetic multifilament yarns where the effective yarn size and number of the filaments in the knot structure is the same as the effective yarn size and number of filaments outside the knot. Thus the fractured film products formed by the process of this invention is particularly useful for tying twines and braided or woven shoe strings and the like where knot slippage is undesirable.

Figure 4:
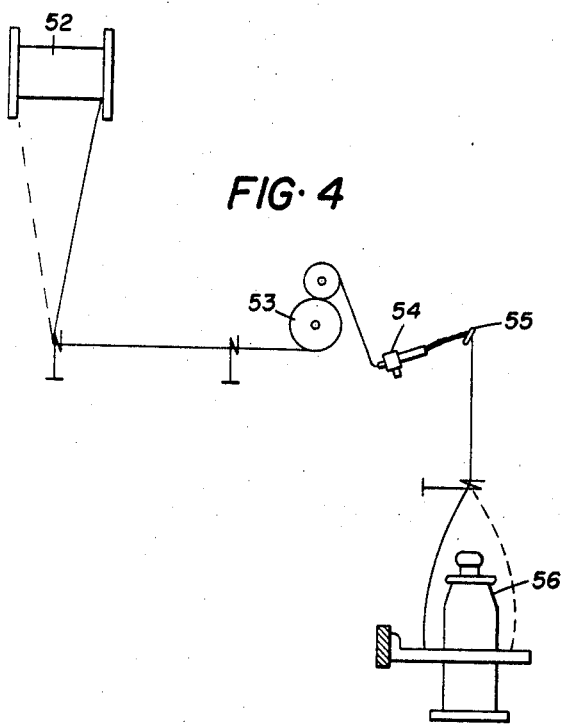
FIGURE 4 is a schematic side elevation view in which some of the parts have been shown in perspective for illustrating an arrangement of apparatus parts whereby the drafted slit film of FIGURE 2 may be disintegrated and twisted into the several new products of the present invention.

In FIGURE 4 is shown a convenient form of apparatus which may be used to process a supply package preformed in an area separate from the film or sheeting manufacturing and drafting. That is, in some instances it may not be convenient or desired to proceed with the continuous-in-line operation exemplified by the apparatus set up in FIGURE 1, hence apparatus arrangement as set forth in FIGURE 4 may be advantageously used. In FIGURE 4 a supply package is indicated at 52. This package may be one containing a ribbon or strip of film which has been slit, drafted and otherwise processed on separate equipment as already described in connection with preceding figures. The film supply is passed through suitable guide members to input feed rolls 53 which feed the film ribbon into jet 54. Rolls 53 are ones which may be suitably controlled to give the desired rate of feeding of the film into the jet.

Jet 54 would be of a construction such as shown in detail in FIGURES 6 and 7 of the instant application. In such a type jet the oriented film is acted upon by a high velocity fluid. This action as will be explained in greater detail hereinafter and as will be more apparent by the several examples which follow causes the oriented film ribbon to disintegrate longitudinally but not laterally into a plurality of individual flat ribbons.

The filaments emerge from the jet at 55 and are taken up on a conventional twister 56. By the twister it is possible to impart the desired degree of twist to the flat filaments as in the twisting of conventional textile filaments.

Figure 5:
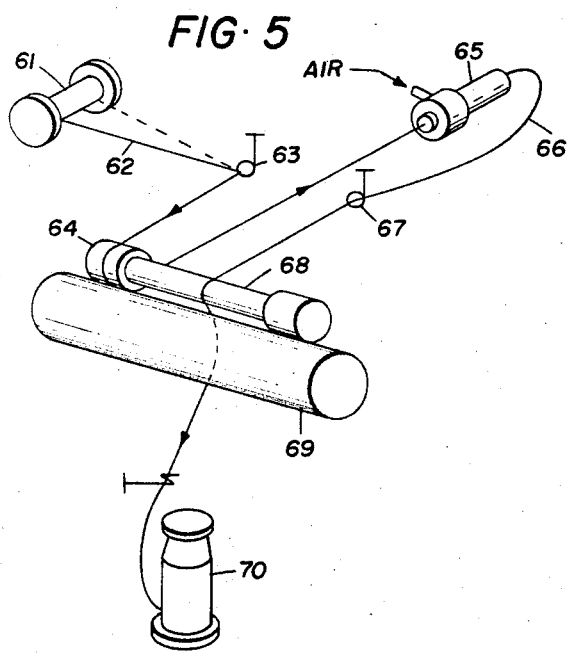
FIGURE 5 is a schematic view somewhat similar to FIGURE 4 showing an arrangement of parts for another method of disintegrating the film of FIGURE 2 into flat partially fractured ribbons.

In FIGURE 5 package 61 is comparable to the package already described with respect to FIGURE 4. A band or ribbon of the film 62 is fed through guide 63 around the enlarged portion of feed roll 64 and into and through jet 65. The jet 65 may be of a construction as already mentioned and as will be referred to in more detail in connection with FIGURES 6 and 7. The film ribbon is fluid treated in the jet and disintegrated into a bundle of flat ribbons which are conducted at an angle 66 away from the exit of the jet through guide 67 and around the smaller circumference of withdrawal roll as at 68 then around roll 69 to the twister 70.

By the construction shown in this FIGURE 5 it was possible to carry out better control and withdrawal of the ribbon to and from the jet. Further details concerning the construction and operation of an apparatus such as just described may be had by reference to our coworker's U.S. Patent 2,884,756.

Referring now to the jet construction of FIGURES 6 and 7 extended description thereof is unnecessary herein. The jet of FIGURE 6 is described in detail in our coworker Head's U.S. Patent 2,884,756. The jet of FIGURE 7 is described in detail in Dyer U.S. Patent 2,924,868.

Likewise extended further description of FIGURE 8 is unnecessary since this figure has been made from photomicrographs or other photographs of flat ribbon products of the present invention.

In its broader aspects the process of this invention may be divided into a number of suboperations as follows: film extrusion, orienting the film, fracturing the flat ribbons in a fluid jet, and twisting the filaments into a yarn. These separate steps in the operation preferably are carried out in one continuous process or in various combinations of subprocessing steps. For example, the film may be extruded in one operation. In the second operation, it may be oriented. The third operation would then consist of flat ribbon forming and twisting into product. A second approach would be to extrude and wind the film full width. The full width roll of film would then be used as a supply for the orienting operation, in which case it could be slit into the certain widths and a plurality of such narrow widths of film would be fed through the drafting process. These drafted ends of film might then be wound up on individual packages. These packages would then be transferred to a third operation wherein the individual ends of film would be passed through fluid jets and twisted into a yarn. In other cases, the drafting and flat ribbon formation may be carried out in one continuous operation and the twist inserted in the yarn in the same or in a subsequent operation. Depending on the type of end product yarn desired, various types of jets may be used so as to induce a range of effects in the finished product. In some cases it has been found that by scoring the film after orientation by drawing it over a metal rod having closely spaced teeth in the order of .01 inch or so apart, the formation of filaments from the film is then made easier in the subsequent fluid jet treatment process. The scoring in the film predisposes the film to break-up more readily at the score lines as the film passes through the fluid jet. This tends to produce a yarn having more uniform filaments than is the case when the yarn is made from unscored film.

While a substantial understanding of our invention is already apparent from the foregoing general description of the overall apparatus and process, a still further understanding will be had for a consideration of the following examples which we set forth to illustrate a number of our preferred embodiments of our operation.

EXAMPLE I

A 1 mil thick film was extruded from No. 4240 polypropylene and slit into a one inch width. This film was drafted at a ratio of 6 to 1 in a radiant heat oven. The drafted film strip was then fractured on the apparatus of FIGURE 1 to produce a 1030 denier product containing flat ribbons averaging 13.5 denier per ribbon in size. That is, the product contained about 80 longitudinal discontinuous slit zones due to its treatment in the gas jet of 2,924,868. This product was four plied with 1.25 t.p.i. to a total denier of 4100 and lubricated with .75 percent of a polyoxyethylene glycol type finishing agent.

The fracturability angle=about 1°
The percent of potential fracturability=50 percent
The draw/neck ratio=5
The fracturability factor=4000

This flat ribbon product yarn which had the appearance of a continuous filament yarn was tufted into a loop pile carpet with 20 ounces of pile yarn per square yard and after backsizing with latex had a pile height of 0.39 inch. The carpet was subjected to a number of tests with the following results.

(1) Table leg depression test 100 pounds/square inches load for 24 hours.

Percent thickness retained five minutes after load removal—45 percent
Percent thickness retained 24 hours after load removal—66 percent
Percent thickness retained 97 hours after load removal—71 percent (2) Accelerated abrasion test using a simulated stair step test.

Cycles of abrasion to wear pile backing—13,200

(3) Floor test—20,000 walk overs

Percent thickness retained—62 percent (4) Burning test—did not support combustion at 0 percent RH.

By comparison a 100 percent acrylic carpet of similar construction had 65 to 67 percent 24 hour table leg test thickness retained values, required only 4000 to 5000 cycles of its original thickness in the floor test and continued to burn after removal of the flame source in the flame test.

EXAMPLE II

The process of Example I was repeated except that the fractured film was heatset for five minutes at 145° C. prior to formation into a carpet warp.

This treatment resulted in an increase in crush resistance of the flat ribbons and values of 79 percent thickness retained after 24 hours recovery in the table leg test and 74 percent thickness retained after the 20,000 walk over floor test. No degradation was noted in the abrasion resistance of the carpet.

EXAMPLE III

Example II was repeated except that several pigments were added to the polypropylene pellets prior to extrusion to produce a black yarn. The draft ratio on the film was slightly reduced and the air jet action was adjusted to increase its severity so as to produce a fractured film with numerous film tendrils. The product had a staple like appearance as a result. Similar carpet tests results were obtained.

EXAMPLE IV

A carpet backing fabric was prepared by weaving the 1030 denier product prepared in Example I into a 17 x 17, 5.7 ounces per square yard plain weave fabric construction. This fabric was compared for properties to a 12.2 ounces per square yard conventional jute carpet backing fabric commonly used for tufted carpets. The results of these fabric tests were as follows:

| | 9629B/6 | Jute |
|---|---|---|
| Fabric Identification | | |
| Fabric Construction | 17 x 17 | 16 x 13 |
| Ends/Dent | 1 | 1 |
| Weight (oz./sq.yd.) | 5.7 | 12.2 |
| Thickness (inches) | 0.035 | 0.031 |
| Scott Ravel Strip Test, Warp: | | |
| Break (lb.) | 149.2 | 150.6 |
| Elongation (percent) | 35.7 | 13.0 |
| Scott Ravel Strip Test, Filling: | | |
| Break (lb.) | 145.0 | 138.8 |
| Elongation (percent) | 40.2 | 4.6 |
| Scott Grab Test, Wrap: | | |
| Break (lb.) | 214.6 | 158.5 |
| Elongation (percent) | 37.0 | 12.5 |
| Scott Grab Test, Filling: | | |
| Break (lb.) | 212.8 | 140.4 |
| Elongation (percent) | 41.6 | 4.5 |
| Repetitive Tests: | | |
| Stoll Flex, Warp (cycles) | 10,662 | 1,736 |
| Stoll Flex, Filling (cycles) | 6,105 | 2,308 |
| Taber Abrasion (cycles) | 3,463 | 715 |
| Wyzenbeek Abrasion (cycles) | 17,657 | 9,313 |

The yarn of Example I was tufted into the polypropylene fabric and into the jute fabric and the loop pile carpets, after latexing, were subjected to a tuft bind test and a piece dyeing test. The efficiency of the tufting operation was excellent for the polypropylene fabric with needle deflection and other faults being greatly minimized as compared to the jute fabric.

The tuft bind test which measures the resistance to pulling of the pile tufts showed that the jute backed carpet required 10.9 pounds to pull out a tuft while the polypropylene backed carpet of the present invention required 11.8 pounds pull to remove a tuft. In dyeing, the jute fabric shrunk 7.5 percent lengthwise and 0 percent in width while the polypropylene fabric shrunk 4.3 percent lengthwise and 2.5 percent in width.

The increased thickness of the polypropylene fabric, 0.035 inch, as compared to the jute fabric, 0.031 inch, contributed to the improved tuft bind and gave the carpet a more sturdy feel. The advantages were obtained even though the polypropylene backing weighed only 47 percent as much as the jute backing and had the further advantages of being mildew, rot and insect resistant and less prone to cause water spotting or staining of the pile yarns than the jute fabric.

The thermoplastic properties of the fractured, flat film carpet backing plus its low cost and weight make it particularly suitable for the deep mold forming of automotive carpets as shown in U.S. Patent 3,078,516. By contrast, the low stretch and stiffness of jute and cotton backing fabrics make them difficult to mold and require that the carpet be cut and hemmed or resewed to conform to the complex shape of the floor in modern automobiles.

The low weight of the backing fabric makes it of particular interest for aircraft carpets where unneeded excess weight represents a loss in aircraft efficiency.

The film thickness, drafting and film fracturing conditions can be varied in preparing pile carpet yarns by the process of this invention to achieve a wide range of effects. For example, while for many rug pile yarns it is desirable to produce fractured ribbons having a low width to thickness ratio in the order of 2:1 up to 6:1, very attractive luster effects can be achieved by selecting the film thickness and fracturing conditions so as to produce yarns containing filaments having width to thickness ratios in the order of 6:1 to 10:1 or more. These yarns when used in 100 percent form or plied with other yarns having a low width to thickness ratio even with conventional round section fibers such as viscose, VEREL modacrylic or nylon carpet fibers make possible carpets having lustrous highlights.

EXAMPLE V

A 350 denier fractured polypropylene unpigmented clear film yarn was prepared by drafting a ⅜" wide 1 mil thick film with a 6.2 to 1 draft ratio and treating it in an air jet to fracture it into 20 to 25 flat ribbons in a random two dimensional plexus. This 350 denier product was then plied with 1.5/1 cotton count viscose yarn and tufted into loop and cut pile carpets having 22 ounces of pile yarn per square yard. The carpet samples were then dyed a dark brown so that only the viscose was colored. The resultant carpets were quite attractive with silvery highlights of the shredded film yarn appearing at random against the brown viscose background.

The ease and low cost of producing lustrous fractured ribbons by our film process of this invention is in marked contrast to the cost and complex melt spinning equipment used in the prior art to produce lustrous monofilaments or multilobal continuous filament yarns by extrusion of individual filaments through spinnerettes containing large numbers of extrusion orifices of complex shapes under carefully controlled conditions of curing or cooling the freshly formed filaments. Moreover the random variation in the cross-sectional shape and size of our fractured film product produce attractive effects not possible with melt spun filaments which cannot be varied in size and shape without falling outside the limits of efficient extrusion, and where each filament is thus very closely the same in appearance as its neighboring filaments when collected into a yarn.

The flat ribbon product of this invention is also useful for the backing of artificial fur fabrics as illustrated by the following example.

EXAMPLE VI

A sample of ⅜" wide by 1 mil clear polypropylene film was drawn with a 6.27 to 1 draw ratio in a steam tube to a final denier of 370. The draw film was fractured in an air jet with 18 p.s.i. air pressure to produce about 36 random slits across the film width to make a product composed of ribbons of 10.2 denier per filament. The product was twisted to 5 t.p.i. and lubricated to reduce its friction. The product strength was 3.87 grams per denier and had a 17.8 percent elongation. The product was used on a Wildman fur pile knitting machine to form the backing of the pile fabric in combination with acrylic staple fibers which formed the fur pile portion of the fabric. The high strength and low density of the polypropylene material of the invention were useful for reducing the total weight of the fabric which is desirable for apparel fabrics.

The finished coat lining fur fabric had 1.88 percent shrinkage lengthwise and 4.38 percent shrinkage widthwise after five wash cycles. Normally 3 percent shrinkage would be expected in backing fabrics made from conventional polypropylene staple yarns and some other fibers such as cotton may result in shrinkages as high as 6 percent.

EXAMPLE VII

A similar test was run using ¾" wide film to produce a 719 denier fractured product. This product was used to form the backing of a fur rug with an acrylic fiber pile fur using a Wildman fur fabric knitting machine. The fractured film backing product was considered acceptable for this use and had good strength and stability as compared to the conventional staple or filament yarns of the prior art.

While the foregoing examples have related to polypropylene fractured film ribbons, the process can be used for production of polyester carpet pile ribbon products also.

EXAMPLE VIII

A 1 mil thick by 1¼" wide 1,4-cyclohexylene dimethylene terephthalate film was extruded and drawn longitudinally with a 1.5 to 1 extrusion draft and a secondary hot draft of 5.44 to 1. It was then fractured in a jet of the type shown in U.S. Patent 2,924,868 at 10 p.s.i. air pressure. Draw/neck length ratio=5/1 and fracturability angle=about 5°. An attractive lustrous staple-like yarn product of 2900 denier was produced which was suitable for use as the pile component in a carpet fabric.

While in the foregoing examples the carpets with either the filament like or staple like flat ribbon product had good bulk and cover as made, these ribbon products can also be textured readily to further enhance their bulk, cover and aesthetic appearance. Thus by proper adjustment of the film fracturing jet and the use of a controlled overfeed of the film to the jet together with a controlled slower speed removal of the fractured film from the jet, a loopy bulky ribbon can be prepared as disclosed in 2,924,868. If desired, more than two strips of film can be fed to the jet at differing rates as disclosed in companion U.S. Patent Applications 544,886, filed Nov. 4, 1955, and 762,067, filed July 30, 1958, to achieve even greater bulk. Slubby variable denier products can also be produced by the use of the process and apparatus of my co-workers Morehead and Jacobs Patent 3,113,413.

A plurality of the fractured film flat ribbon products can be readily crimped by suitable adjustment of the jet to entangle the fractured ribbons to produce an integrated product prior to the feeding of several ends of the product to the stuffer box crimper by the process of companion Haynes Patent 3,099,064.

In addition, if desired a random crimp can be imparted to the ribbon product by the use of a hot gas in the jet as disclosed in companion application Ser. No. 219,610, filed Aug. 27, 1962, now abandoned.

As can be seen from the foregoing, a wide range of inexpensive yet attractive carpet pile and fabric products can be readily produced by the processes disclosed herein. The pile fabric products described herein have novel and improved characteristics over those of the prior art which were made from conventional synthetic or natural fibers and yarns.

The use of the fractured film product of this invention for the backing fabrics of woven or knitted construction imparts desirable improvements in their strength and extends their usefulness.

One of the most versatile uses of our invention is illustrated by the following example.

EXAMPLE IX

A 5 mil thick film was extruded from a polypropylene composition containing black pigment for ultraviolet degradation resistance and antioxidant for heat resistance. A sheet of this film approximately 11 inches wide was fed between a pair of nip rolls at 37.5 feet per minute to a heated draw zone from which the film was withdrawn at a rate of 450 feet per minute by a second pair of nip rolls to give a net draw ratio of 12 to 1. The drawn film was approximately 5 inches wide and 1 mil thick after drawing. The drawn film was then fed to a jet as described in Dyer U.S. Patent 3,081,951.

The jet was fed with air at 30 pounds per square inch gauge and adjusted so that the 5 inch wide film was slit to such an extent that 80 to 100 slits were formed across the film at all points along its length. The discontinuous ribbons defined by the slits were of a rectangular cross-section and of a cross-sectional area having a mean of about .00005 square inch. The film subsequently was twisted to .63 turn per inch on a twister-winder to produce a twine suitable for use on commercially available hay baling machinery. The twine, of 25,000 denier, represented a yield of about 535 feet per pound and a strand diameter of about 3/16 inch. It had a knot strength of 100–130 pounds and a tensile strength of 150 to 250 pounds break.

The draw/neck length ratio was 12 to 1. The resultant twine had less than 1 percent boiling water shrinkage and about 18 percent shrinkage in hot air at a temperature of 140° C. It has an elastic stiffness of greater than 70. The longitudinal strength before jet fracturing was 6.5 grams per denier, and the transverse strength before fracturing was .00143 gram per denier for a fracturability factor of 4550. The fracturability angle was less than 1°. The fracturing action of the jet was adjusted so that about 6 percent of the potential fracturability was carried out. Thus there was a residual fracturability of about 94 percent left in the film prior to formation into a yarn. When this yarn is knotted in use, it is found that very low knot slippage is encountered. The elongation of a length of twine containing a baler twine knot in the center of the test length is usually less than 10 percent greater than the elongation of an unkotted test length of twine. In this example the elongation that could be attributed to the knot was in the order of 7 percent.

When tested on a commercially available (New Holland) hay baler, the twine processed well without kinking or jamming in the baler mechanism. The knots tied by the machine showed no evidence of a tendency to slip or otherwise fail. The twine had the desired degrees of flexibility and rigidity (i.e., stiffness) required for good operation.

Although the invention has been described in considerable detail with particular reference to certain preferred embodiments thereof, variations and modifications can be effected within the spirit and scope of the invention as described hereinabove and as defined in the appended claims.

We claim:
1. An improved process for producing a fractured film product comprising the steps of providing a film of a polymeric material, subjecting said film to longitudinal drafting in a zone where draw/neck occurs so as to cause it to become unilaterally oriented whereby the longitudinal tensile strength thereof is increased and the lateral strength is diminished thereby rendering said film susceptible to fracturing, subjecting said film to fracturing forces sufficient to cause discontinuous longitudinally extending slits to be formed in said film thereby producing a plurality of elongated, interconnected, flat ribbons; the improvement comprising drafting said film in said zone at an elevated temperature, the total length of said zone being at least five times the distance from the point where the film enters said zone to the point in said zone where the draw/neck occurs whereby said fractured film has low boiling water and hot oven shrinkage.

2. An improved process according to claim 1 wherein said film is drafted at a ratio in the range of from about 3:1 to about 15:1.

3. An improved process according to claim 2 wherein the temperature of said zone is in the range of from about 300° F. to about 400° F.

4. An improved process according to claim 1 wherein the total length of said zone is at least twelve times said distance.

5. A textile yarn product produced by the process of claim 1 wherein said filaments have a width to thickness ratio of greater than about 1:1.

6. The product produced by the process of claim 1 wherein said polymeric material of said film is a polyolefin.

7. The product produced by the process of claim 1 wherein said polymeric material of said film is polypropylene.

8. The product produced by the process of claim 1.

References Cited

UNITED STATES PATENTS

| | | | |
|---|---|---|---|
| 3,113,413 | 12/1963 | Jacobs et al. | 57—34 |
| 3,118,269 | 1/1964 | Bilsky | 57—34 |
| 3,081,519 | 3/1963 | Blades et al. | 57—140 |
| 3,124,926 | 3/1964 | Woodell | 57—140 |
| 2,948,927 | 8/1960 | Rasmussen | 28—1 |
| 2,980,682 | 5/1961 | Costa et al. | 28—1 |
| 3,177,557 | 4/1965 | White | 28—72 |
| 3,293,844 | 12/1966 | Wininger et al. | 57—157 |

JOHN PETRAKES, *Primary Examiner.*